United States Patent [19]
Nishijima

[11] Patent Number: 5,210,662
[45] Date of Patent: May 11, 1993

[54] TRACKING CONTROL APPARATUS FOR MAGNETIC DISK

[75] Inventor: Hisanao Nishijima, Morioka, Japan

[73] Assignee: Matsushita Electric Industrial Co., Ltd., Osaka, Japan

[21] Appl. No.: 665,998

[22] Filed: Mar. 6, 1991

[30] Foreign Application Priority Data

Mar. 9, 1990 [JP] Japan ................................. 2-58298

[51] Int. Cl.$^5$ ............................................ G11B 5/596
[52] U.S. Cl. .............................. 360/77.04; 360/77.02; 360/77.08
[58] Field of Search ............... 360/77.02, 77.04, 77.07, 360/77.08, 77.11

[56] References Cited

U.S. PATENT DOCUMENTS 4,412,161 10/1983 Cornaby ........................... 360/75 X Primary Examiner—Joseph L. Dixon
Assistant Examiner—David L. Robertson
Attorney, Agent, or Firm—Stevens, Davis, Miller & Mosher

[57] ABSTRACT

There is provided a tracking control apparatus for controlling the position of a recording and reproducing head with respect to a recording track by detecting a plurality of kinds of servo marks disposed at fixed intervals from the center line of a recording track on a magnetic disk. The present apparatus comprises a position error coefficient computation device responsive to position error values in a plurality of positions of the recording and reproducing head on the track and position signals at those times to correct a coefficient to be used for calculating a position error, and an actuator responsive to an output signal of the computation device. Thereby, it is possible to obtain an accurate position error signal which depends upon neither the track pitch nor the core width of the recording and reproducing head.

1 Claim, 6 Drawing Sheets

TRACKING CONTROL APPARATUS FOR MAGNETIC DISK

BACKGROUND OF THE INVENTION

1. Field of the Invention

The present invention relates to a tracking control apparatus used in a magnetic disk apparatus or the like.

2. Description of the Related Art

In conventional magnetic disk apparatuses, recording and reproducing widths of heads were reduced as the track density was raised. Tracking control was performed to cope therewith. That is to say, servo areas each having a plurality of servo patterns as one set are disposed on a track to generate a position error signal, and a command is supplied to an actuator so that this position error signal may become small, a recording and reproducing head being thus positioned on a desired data track.

A conventional tracking control apparatus will now be described by referring to drawings. FIG. 9 is a configuration diagram of a tracking control apparatus using sector servo performed by servo areas respectively disposed on sectors of a data track. The same components as those of FIG. 1 which shows an embodiment are denoted by like numerals.

A signal on a disk reproduced by a recording and reproducing head 1 is amplified by an amplifier 2 and then inputted to timing signal generation means 3 and reproduced output level measurement means 7. FIG. 2 exemplifies data tracks and servo areas written on a disk. As shown in FIG. 2, a reproduced signal obtained when the recording and reproducing head 1 passes becomes a train of pulses having time intervals predetermined by a servo mark, and the magnitude of its amplitude is proportionate to the overlapping width of the recording and reproducing head and the servo mark. FIG. 6 shows the configuration of the timing signal generation means 3 whereto the reproduced signal supplied from the amplifier 2 is inputted. The timing signal generation means 3 comprises measurement timing signal generation means 20, servo mark detection means 21, and servo area detection means 22. The measurement timing signal generation means 20 generates a servo output measurement timing signal 4 functioning as timing in measuring the magnitude of the reproduced output on the servo mark. In response to this, the reproduced output level measurement means 7 is activated to generate a servo level signal 8. Further, the servo mark detection means 21 detects a train of pulses predetermined as the servo mark out of the reproduced signal, generates a servo mark discrimination signal 5 indicating the classification of that servo mark, and outputs it to servo signal storage means 9. The servo signal storage means 9 stores the servo level signal 8 and the servo mark discrimination signal 5 in association with the servo mark. The servo area detection means 22 detects one cluster of servo areas and outputs a position error signal generation timing signal 6 to position error signal generation means 10. On the basis of data of the servo signal storage means 9, a position error signal 11 is calculated. Control means 12 applies predetermined computation to this position error signal 11 and issues a command of movement value to a head actuator 13 for moving the recording and reproducing head 1.

The method for calculating the position signal 11 will now be described. FIG. 3 shows dependence of the magnitude of the servo level signal 8 outputted by the reproduced output level measurement means 7 upon the magnitude of the off-track quantity x between the track center and the recording and reproducing head when the recording and reproducing head passes through the servo mark. Data tracks are written at track intervals $T_p$, and servo marks A and B are written at a displacement of $T_p/2$. The width $H_2$ of the servo marks is equivalent to the core width of the recording and reproducing head at the time of writing. Assuming now that the core width at the time of reading is $H_1$, the servo level signals obtained when the servo marks A and B are passed are signals which do not change in magnitude for a width of $|H_1 - H_2|/2$ as respectively represented by $V_a(x)$ and $V_b(x)$. In this case, $H_1$ is not equal to $H_2$. Even if $H_1$ is equal to $H_2$, however, the following description holds true.

Assuming that the recording and reproducing head is off track by x, the servo level signals are respectively represented as $$V_a(x) = \frac{V_p \cdot \left( \frac{-T_p + H_1 + H_2}{2} - x \right)}{\frac{-T_p + H_1 + H_2}{2} - \frac{-T_p + H_1 - H_2}{2}} =$$

$$\frac{V_p \left( \frac{-T_p + H_1 + H_2}{2} - x \right)}{H_2}$$

$$V_b(x) = \frac{V_p \left( x - \frac{T_p - (H_1 + H_2)}{2} \right)}{\frac{T_p - (H_1 - H_2)}{2} - \frac{T_p - (H_1 + H_2)}{2}} =$$

$$\frac{V_p \left( x - \frac{T_p - (H_1 + H_2)}{2} \right)}{H_2}$$

$$\left( \text{when } \frac{|H_1 - H_2|}{2} < x < T_p - \frac{|H_1 - H_2|}{2} \right).$$

At this time, the position error signal is calculated by $$\frac{V_a(x) - V_b(x)}{V_a(x) + V_b(x)}.$$

From the relation $$\frac{V_a(x) - V_b(x)}{V_a(x) + V_b(x)} = \frac{2x}{T_p - H_1 - H_2},$$

we get $$x_1 = \frac{(T_p - H_1 - H_2)(V_a(x) - V_b(x))}{2(V_a(x) + V_b(x))}.$$

Since $T_p$, $H_1$ and $H_2$ have predetermined values, the position error signal $x_1$ can be derived. The control means 12 issues a command value to the head actuator 13 so that $x_1$ may be made small. It is thus possible to accurately position the recording and reproducing head 1 on the data track.

As heretofore described, it is possible to derive a position error signal and perform positioning in the above described conventional tracking control apparatus as well.

However, the above described conventional tracking control apparatus has a problem that it is necessary to predetermine the core width of the recording and reproducing head at the time of servo pattern writing and reading in order to calculate the position error signal as described above. That is to say, when a servo pattern is to be written by using the prior art, lowering in tracking characteristics caused by dispersion of position error signals of individual magnetic disk apparatuses is suppressed by positioning the recording and reproducing head accurately and making the dispersion of the core width at the time of working as small as possible. As the track density becomes higher in recent years, however, the core width becomes narrower and the influence of the working precision on the position error signal becomes large. Further, precise working is difficult technically as well, resulting in a higher cost. Further, various contrivances are executed in order to perform accurate writing when a servo pattern is to be written onto a disk. Thus, special provisions are necessary or it takes a time to perform writing, resulting in problems. Further, in case a magnetic disk apparatus having an exchangeable disk such as a floppy disk apparatus has a self-formatting function of writing a servo pattern with each drive, dispersion in track pitch and core width becomes further larger and the precision of the position error signal is extremely aggravated.

SUMMARY OF THE INVENTION

The present invention solves the above described problems. An object of the present invention is to provide an excellent tracking control apparatus which does not need imposing strict restriction on the core width of the recording and reproducing head even in a floppy disk apparatus having a self-formatting function and a high track density.

In order to achieve the above described object, the present invention makes possible accurate tracking control by correcting the position error signal by means of position detection means attached to the head actuator, position error coefficient computation means, position error signal generation means, and control means.

In accordance with the present invention, the position signal of the position detection means and the position error signal at that time are measured in a plurality of places and coefficients for calculating the position error signal from the servo level signal and the servo mark discrimination signal are derived beforehand by using the above described configuration. Thereby, it is possible to derive an accurate position error signal which is not affected by dispersion in track pitch and core width of the recording and reproducing head.

DESCRIPTION OF THE PREFERRED EMBODIMENTS

Figure 1:
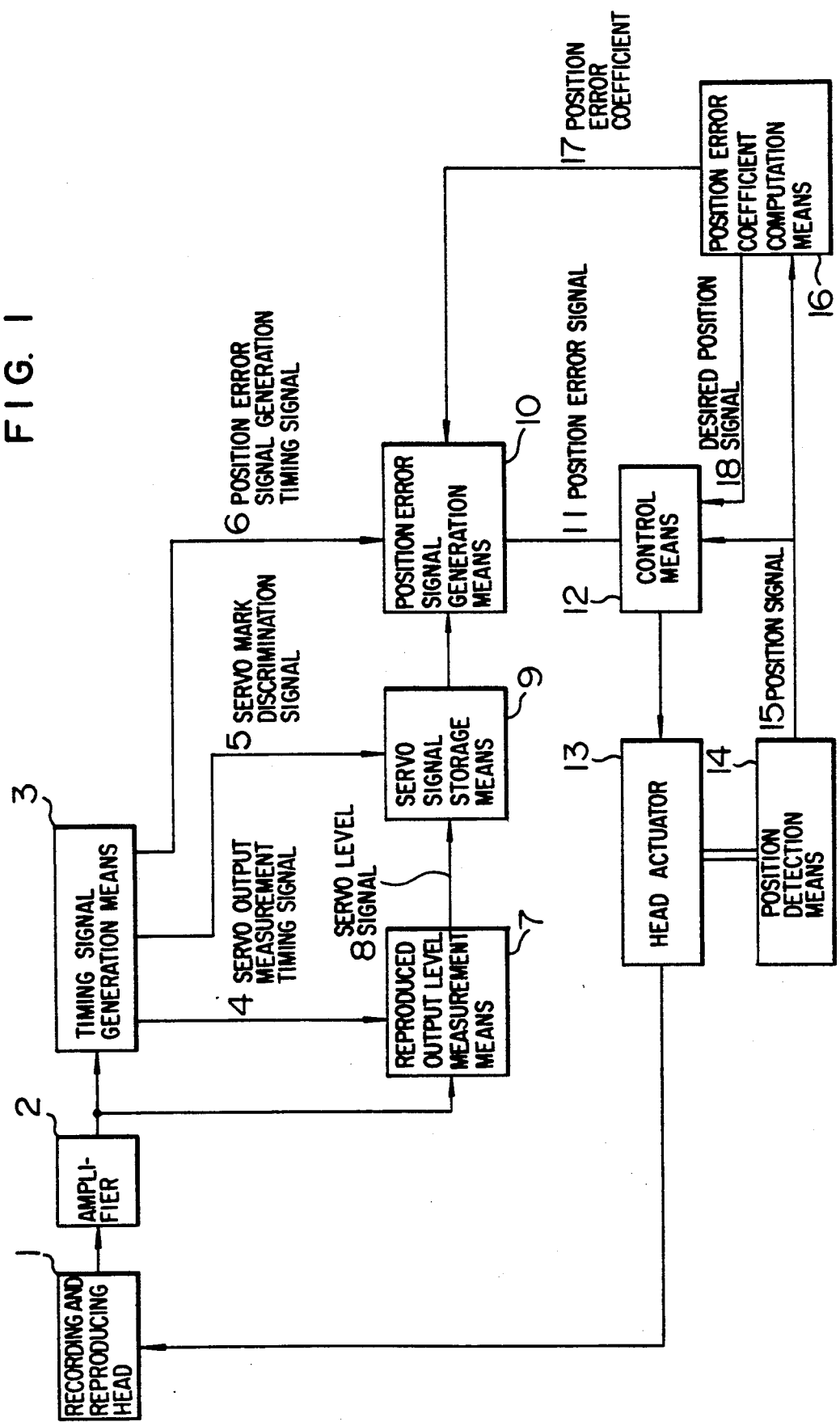
FIG. 1 is a schematic block diagram of a tracking control apparatus in an embodiment of the present invention.

FIG. 1 shows the configuration of an embodiment of the present invention. The configuration and operation of the present embodiment will hereafter be described by referring to drawings.

Figure 2:
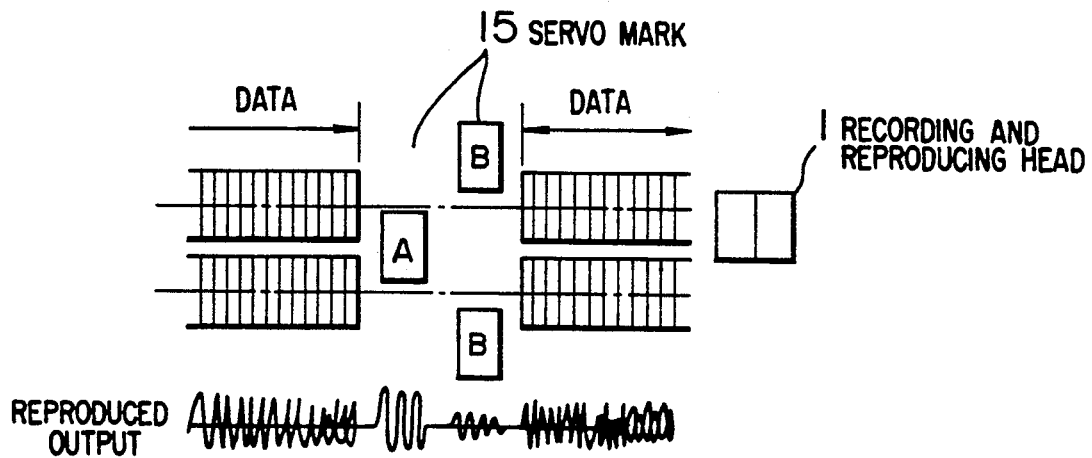
FIG. 2 is an arrangement diagram of servo marks in the tracking control apparatus.
Figure 3:
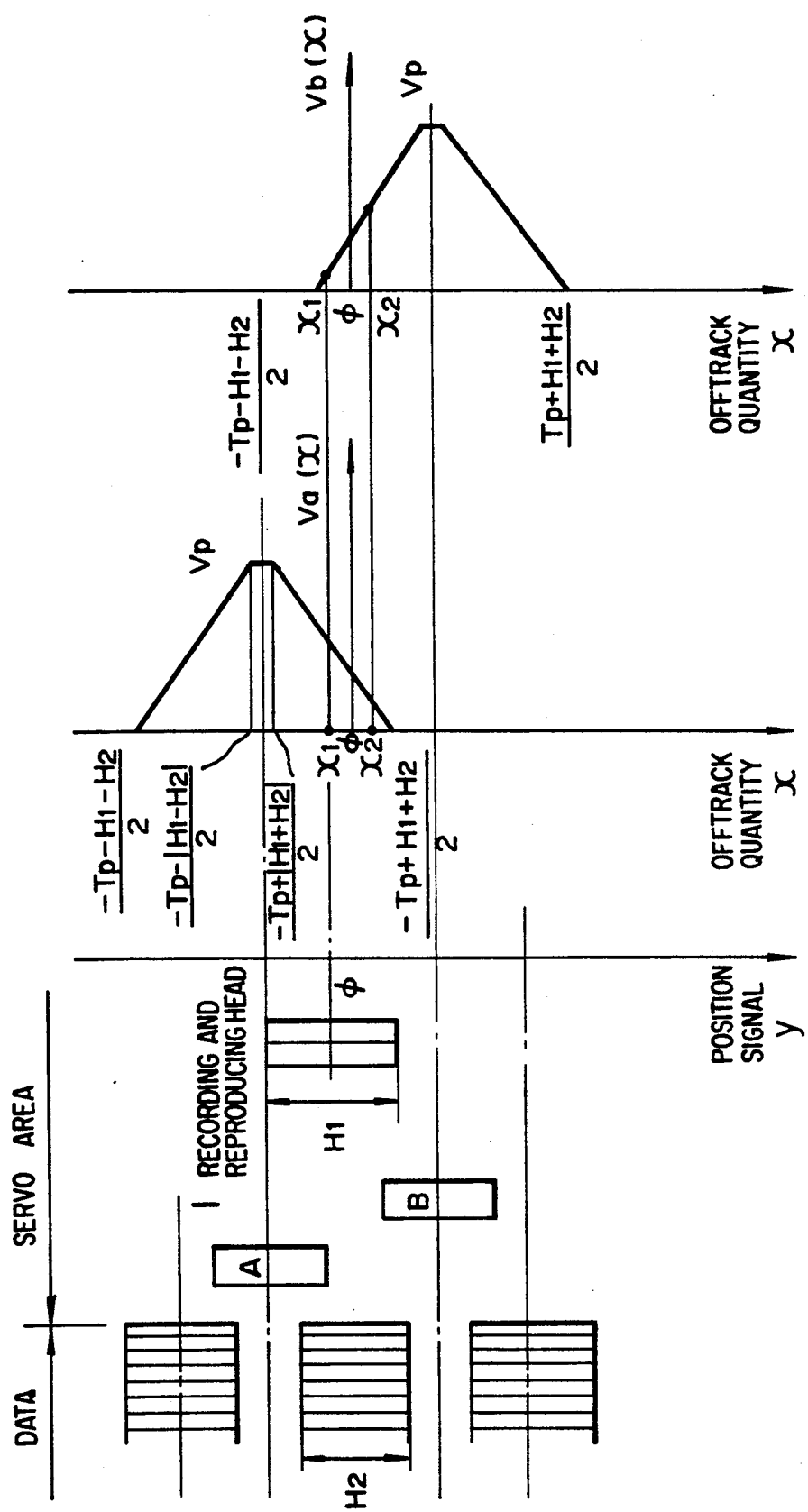
FIG. 3 is a diagram showing servo levels of servo marks illustrated in FIG. 2.

Operation of the recording and reproducing head 1, amplifier 2, timing signal generation means 3, reproduced output level measurement means 7, servo signal storage means 9 and head actuator 13, and signals generated by them are the same as those in the description of the example of the conventional art. Further, data tracks and servo area written on a disk are exemplified in FIG. 2. The relation between the off-track quantity obtained when the recording and reproducing head passes through a servo mark and the magnitude of the servo level signal is shown in FIG. 3.

Assuming now that the position error signal is $T_{el}$ when the off-track is $x_1$, the position error signal generation means 10 reads a position error coefficient 17 ($K_1$) outputted from position error coefficient computation means 16 and performs computation as follows.

$$T_{el} = K_1 \frac{V_a(x_1) - V_b(x_1)}{V_a(x_1) + V_b(x_1)}$$

Here, $V_a(x_1)$ and $V_b(x_1)$ are respectively magnitudes of reproduced outputs of servo marks A and B detected on the basis of the servo level signal 8 outputted from the reproduced output level measurement means 7 and the servo mark discrimination signal 5 outputted from the timing signal generation means 3. The $V_a(x_1)$ and $V_b(x_1)$ are stored into the servo signal storage means 9 and then taken into the position error signal generation means 10 in response to generation of the position error signal generation timing signal 6 indicating a cluster of servo areas. $T_{el}$ is thus calculated. On the basis of this magnitude, the control means 12 performs predetermined computation and outputs a command value to the head actuator 13 so that the off-track from the data track of the recording and reproducing head 1 may become small.

Calculation of the position error coefficient 17 will now be described. Immediately after power is supplied in a magnetic disk apparatus or immediately after a disk is exchanged in a magnetic disk apparatus such as a floppy disk apparatus in which a disk forming a recording medium is exchanged, the position error coefficient computation means 16 outputs an initial value $k_0$ of the position error coefficient 17. This value depends upon a predetermined track pitch and the core width of the recording and reproducing head and is represented as $$k_0 = \frac{T_p - H_1 - H_2}{2}$$

where $T_p$ is the track pitch, $H_1$ is the core width at the time of reading, and $H_2$ is the core width at the time of writing. Since $H_1$ and $H_2$ are corrected according to the value of $k_0$ as described later, predetermined values may be used. The position error coefficient computation means 16 outputs an appropriate desired position signal 18 ($Ry_1$) to the control means 12. In response to this value, the control means 12 supplies a command value to the head actuator to move the recording and reproducing head 1 by a minute distance. At that time, the position error signal generation means 10 reads the position error signals $V_a(x_1)$ and $V_b(x_1)$ as well as a position signal $y_1$ outputted from position detection means 14 and performs the following computation.

$$E_1 = k_0 \frac{V_a(x_1) - V_b(x_1)}{V_a(x_1) + V_b(x_1)}$$

In the same way, a desired position signal 18 ($Ry_2$) is outputted and $E_2$ is derived. At the same time, a position signal $y_2$ is read.

$$E_2 = k_0 \frac{V_a(x_2) - V_b(x_2)}{V_a(x_2) + V_b(x_2)}$$

$E_1$ and $E_2$ are proportionate to the off-track value. Assuming that the coefficient is $a$, we get the following relation.

$$E_1 - E_2 = ax_1 - ax_2 = a(y_1 - y_2)$$

This can be rewritten as follows.

$$a = \frac{E_1 - E_2}{y_1 - y_2}$$

On the basis of the relation $$x_1 = \frac{E_1}{a} = \frac{k_0}{a} \frac{V_a(x_1) - V_b(x_1)}{V_a(x_1) + V_b(x_1)},$$

therefore, the position error coefficient computation means 16 change the value $k_0$ to $$k_2 = \frac{k_0}{a} = k_0 \frac{y_1 - y_2}{E_1 - E_2}$$

as the position error coefficient 17. After this processing, the position error signal generation means 10 calculates a position error signal $T_e$ by using the following ration.

$$T_e = k_2 \frac{V_a(x) - V_b(x)}{V_a(x) + V_b(x)}.$$

As evident from the description heretofore made, $k_2$ is a value corrected in response to the dispersion in track pitch and core width of the recording and reproducing head. Thereby, the accurate position error signal 11 can be derived.

Figure 4:
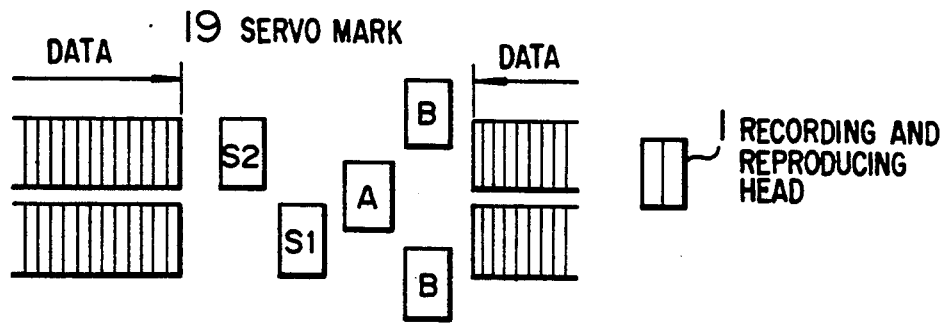
FIG. 4 is an arrangement diagram of servo marks in another embodiment.
Figure 5:
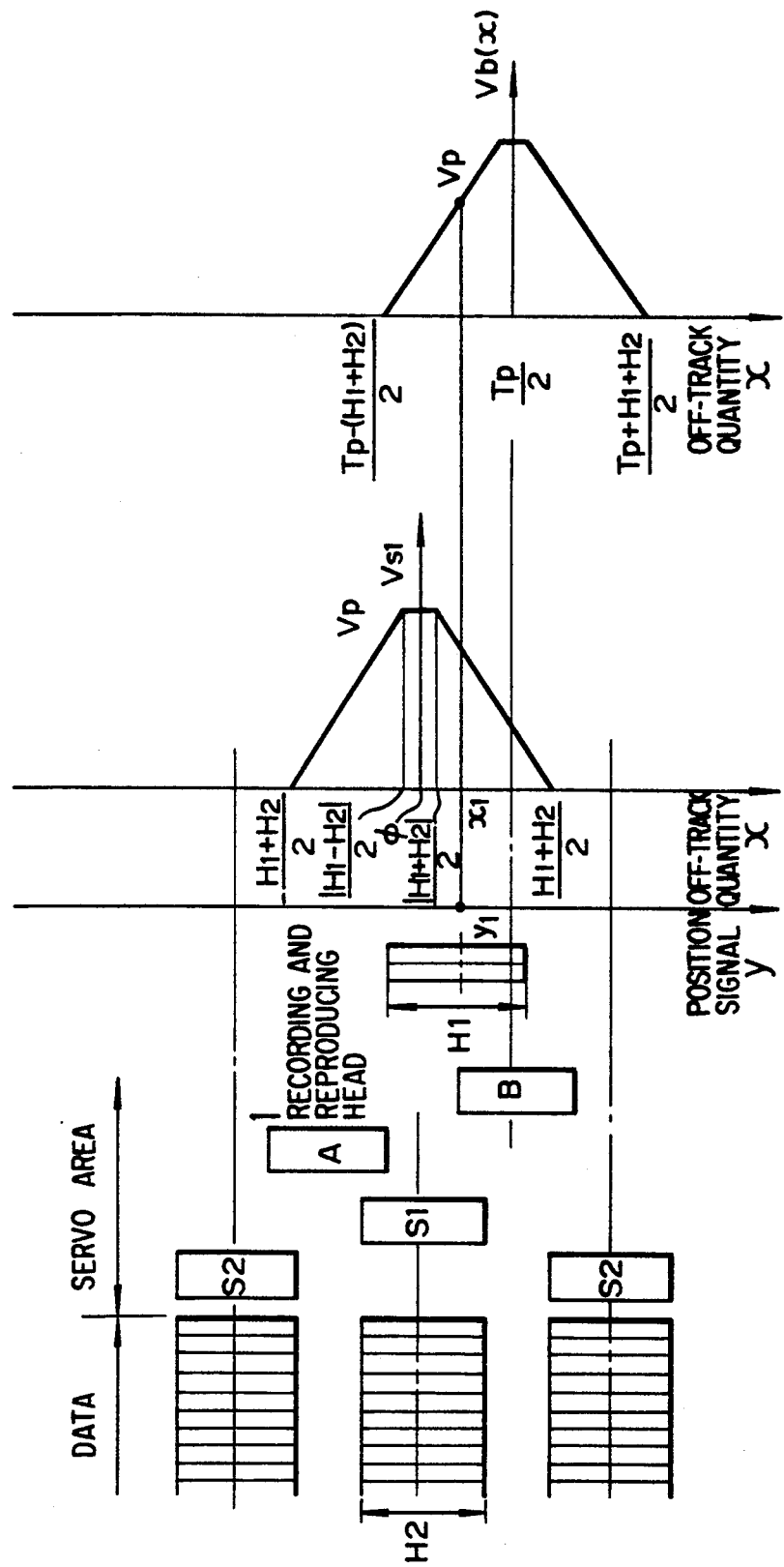
FIG. 5 is a diagram showing servo levels of FIG. 4.

Another embodiment will now be described by referring to FIGS. 4 and 5. FIG. 4 shows an example of sector servo having a feature that servo marks are also disposed on the same radius as data tracks. An object of the example shown in FIG. 4 is to derive a position error signal by using a servo mark located on a data track in case the recording and reproducing head is off track and detection is impossible because of lowering of the signal-to-noise ratio of a specific servo mark. FIG. 5 shows how the magnitude of the servo level signal 8 changes as a function of the off-track value x from the track center. In the same way, a servo level signal $V_{s1}(x)$ corresponding to a servo mark S1 becomes $$V_{s1}(x) = \frac{V_p}{H_2} \left( \frac{H_1 + H_2 - 2x}{2} \right)$$

where $$\frac{|H_1 - H_2|}{2} < x < T_p - \frac{|H_1 - H_2|}{2}.$$

At this time, the position error signal is calculated by using the following function.

$$\frac{V_{s1}(x) - V_b(x)}{V_{s1}(x) + V_b(x)}$$

From the relation $$\frac{V_{s1}(x) - V_b(x)}{V_{s1}(x) + V_b(x)} = \frac{-2x + \frac{T_p}{2}}{H_1 + H_2 - \frac{T_p}{2}},$$

we get $$x =$$

$$\left\{ \frac{(V_{s1}(x) + V_b(x))\left(H_1 + H_2 - \frac{T_p}{2}\right)}{V_{s1}(x) + V_b(x)} - \frac{T_p}{2} \right\} \times \frac{1}{2} =$$

$$\frac{V_{s1}(x) - V_b(x)}{V_{s1}(x) + V_b(x)} q - \gamma$$

where $$q = \frac{H_1 + H_2 - \frac{T_p}{2}}{-2}, \gamma = \frac{T_p}{4}.$$

The position error coefficient computation means 16 outputs an initial value $G_0$ of the position error coefficient 17 having a value represented as $$G_0 = \frac{H_1 + H_2 + \frac{T_p}{2}}{-2}.$$

Desired position signals $Ry_1$ and $Ry_2$ are then outputted. Position error signals $V_{s1}(x_1)$, $V_b(x_1)$, $V_{s1}(x_2)$ and $V_b(x_2)$ as well as $y_1$ and $y_2$ are read in respective positions, and the following computation is performed.

$$\begin{cases} E_1 = G_0 \frac{V_{s1}(x_1) - V_b(x_1)}{V_{s1}(x_1) + V_b(x_1)} - \gamma \\ E_2 = G_0 \frac{V_{s1}(x_2) - V_b(x_2)}{V_{s1}(x_2) + V_b(x_2)} - \gamma \end{cases}$$

$E_1$ and $E_2$ are proportionate to the off-track value. Assuming that the coefficient is $\beta$ and the intercept is $\alpha$, we get the following relation.

$$E_1 - E_2 = \beta x_1 + \gamma - (\beta x_2 + \gamma)$$
$$= \beta(y_1 - y_2)$$

Therefore, we get the following expression.

$$\beta = \frac{E_1 - E_2}{y_1 - y_2}$$

As a result, the position error coefficient computation means 16 changes $G_0$ to a value $$G_2 = \frac{G_0}{\beta} = G_0 \frac{y_1 - y_2}{E_1 - E_2}$$

as the position error coefficient 17. After this processing, the position error signal generation means calculates the position error signal $T_e$ by using the following relation.

$$T_e = G_2 \frac{V_{s1}(x) - V_b(x)}{V_{s1}(x) + V_b(x)}$$

Two examples of servo mark arrangement have heretofore been described. However, it can be easily understood that a similar effect is obtained by simultaneously deriving the position signal at that time even if the kinds of servo marks are increased or the position error signal is calculated by the following equation, for example.

$$T_e = I_2 \frac{V_d(x) - V_b(x)}{2V_{s1}(x) + |V_d(x) - V_b(x)|}$$

Figure 6:
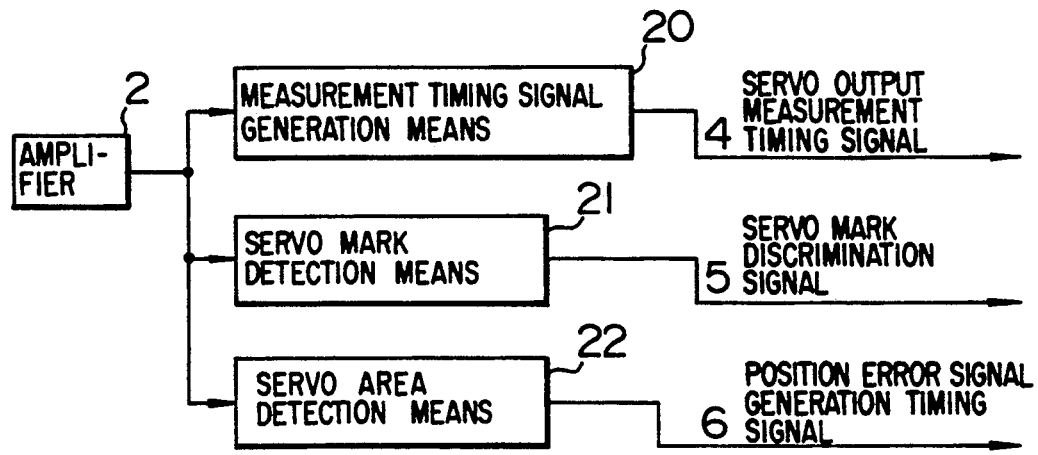
FIGS. 6, 7 and 8 are diagrams each showing the configuration of timing signal generation means.
Figure 7:
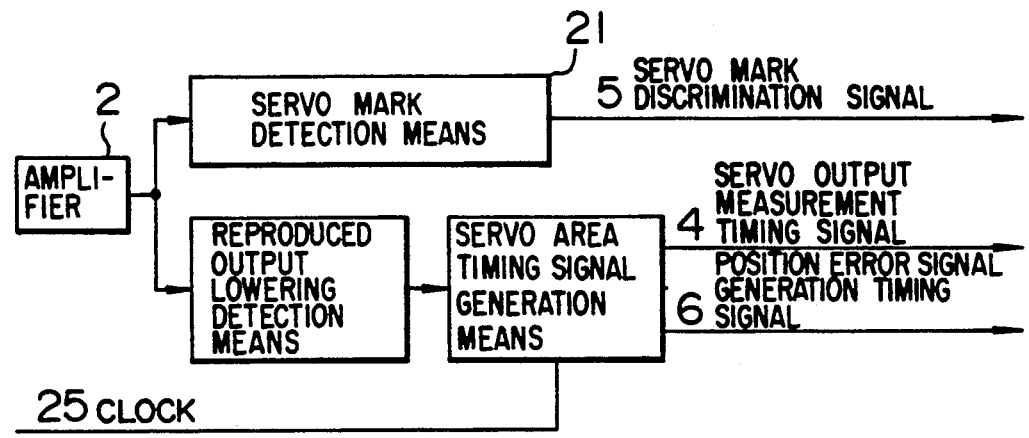
Figure 8:
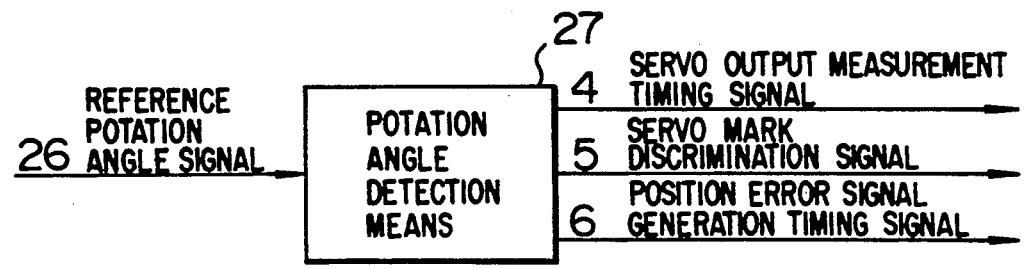
Figure 9:
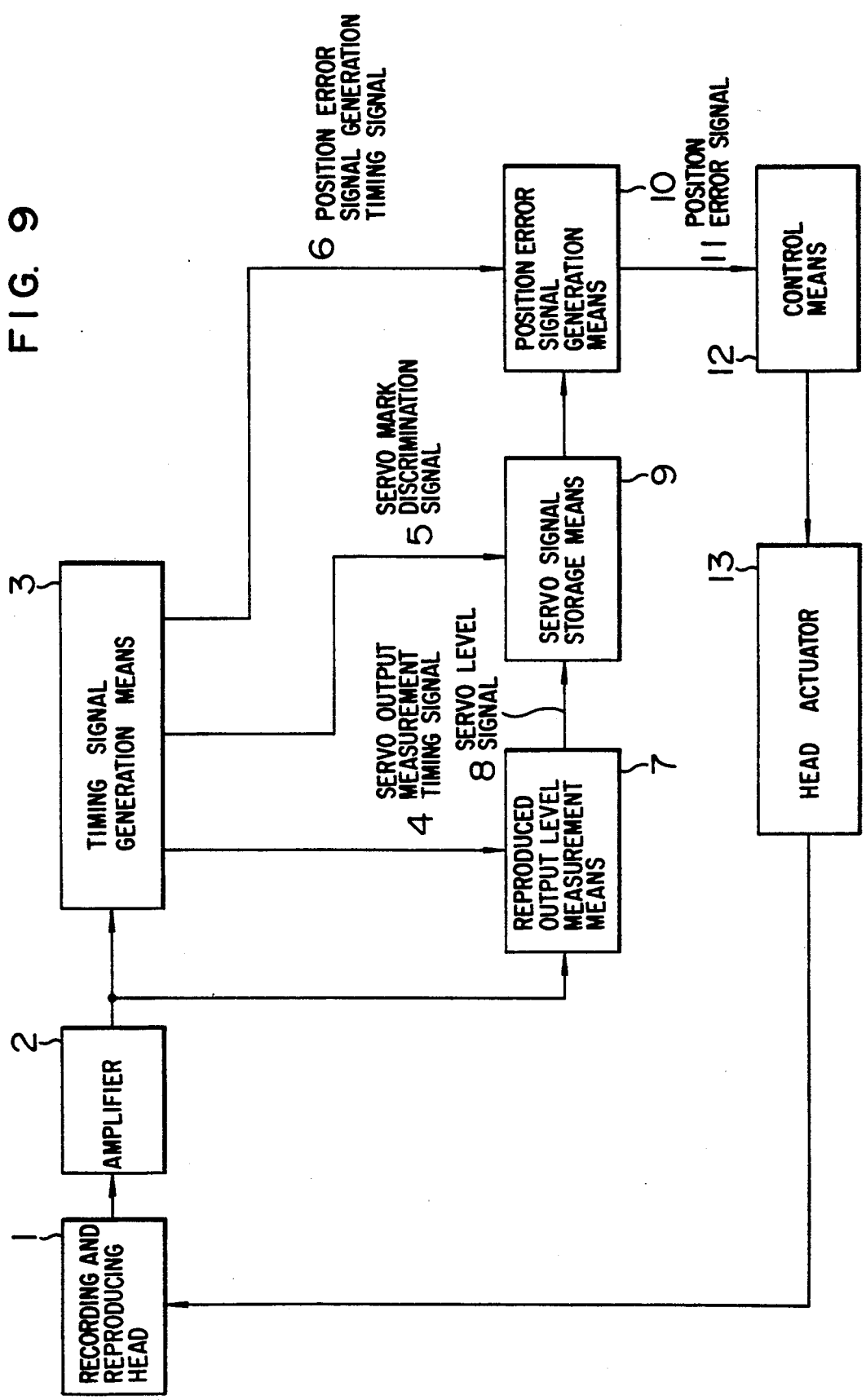
FIG. 9 is a schematic block diagram of a tracking control apparatus of the conventional art.

FIGS. 7 and 8 show other embodiments of configuration of the timing signal generation means. In FIG. 7, the reproduced signal supplied from the amplifier 2 is inputted to the servo mark detection means 21 and reproduced output lowering detection means 23. Operation of the servo mark detection means 21 is the same as that of FIG. 6 described before. The reproduced output lowering detection means 23 detects the fact that the reproduced output supplied from the amplifier has become extremely small and outputs a signal to servo area timing signal generation means 24. After the lowering in reproduced output has been detected, the servo area timing signal generation means 24 measures time by using a suitable clock 25 and outputs the servo output measurement timing output 4 and the position error signal generation timing signal 6 according to servo mark arrangement. Further, the embodiment of FIG. 8 is so configured as to be responsive to a reference rotation angle signal 26 supplied from a disk or a rotor section of a motor rotated in synchronism with the disk to generate the above described servo output measurement timing signal 4, servo mark discrimination signal 5 and position error signal generation timing signal 6 at timing corresponding to the servo mark arrangement.

When a position error signal is to be derived from the magnitude of the servo mark reproduced output, the initial value of the position error signal and the magnitude of the position signal at that time are measured at a plurality of off-track values to correct the position error coefficient as heretofore described. As a result, it is possible to obtain an accurate position error signal which depends upon neither the track pitch nor the core width of the recording and reproducing head.

As evident from the above described embodiments, the present invention brings about an effect that an accurate position error signal can be derived by using the position detection means and position error coefficient computation means and by correcting coefficients, which are used for calculating the position error, on the basis of the position error values measured at a plurality of positions and the position signals at those times.

I claim:

1. A tracking control apparatus comprising:
   a tracking control apparatus proper for controlling the position of a recording and reproducing head with respect to a recording track by detecting a plurality of kinds of servo marks disposed at fixed intervals from the center line of a recording track on a rotating magnetic recording disk;
   position error coefficient computation means responsive to position error values in a plurality of positions of said recording and reproducing head on said track and position signals at those times to correct a coefficient to be used for calculating a position error; and
   an actuator responsive to an output signal of said computation means to move said recording and reproducing head.

* * * * *